United States Patent [19]

Lee

[11] Patent Number: 4,489,484
[45] Date of Patent: Dec. 25, 1984

[54] METHOD OF MAKING THIN FILM MAGNETIC RECORDING HEADS

[76] Inventor: Fred S. Lee, 6705 Eastwood Cir., Oklahoma City, Okla. 73132

[21] Appl. No.: 830,104

[22] Filed: Sep. 2, 1977

[51] Int. Cl.$^3$ ............................................. G11B 5/42
[52] U.S. Cl. .................................. 29/603; 360/103; 360/113; 427/131
[58] Field of Search ......................... 29/603; 427/131; 360/103, 113, 122, 125

[56] References Cited

U.S. PATENT DOCUMENTS 3,787,964  1/1974  Simon et al. ........................ 29/603
3,908,194  9/1975  Romankiw ...................... 29/603 X

*Primary Examiner*—Carl E. Hall

[57] ABSTRACT

A method of manufacture for forming a novel magnetic read/write transducer head of the type utilizing thin film materials. The method of manufacture comprises steps which deposit a thin film magnetic recording head on a selected substrate having dimensions which enable batch manufacture of a thin film magnetic transducer in combination with its supporting slider assembly. The substrate of selected material in large wafer form is subjected to a series of thin film deposition, etching and plating operations to form a plurality of thin film magnetic heads thereon. Thereafter, the substrate wafer is diced around each thin film magnetic transducer head with subsequent finishing and polishing to requisite shape thereby to yield the complete slider and transducer head assembly.

8 Claims, 7 Drawing Figures

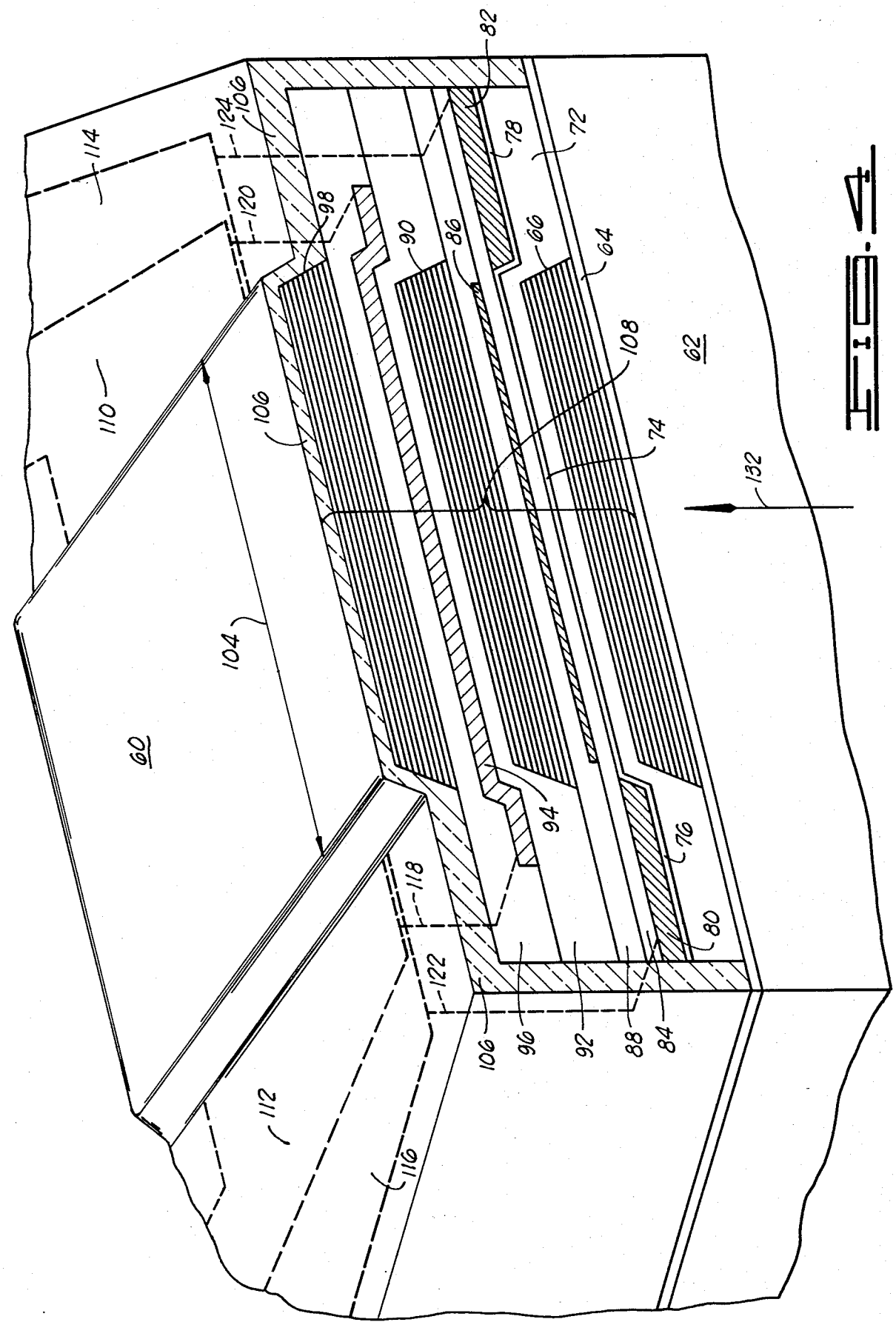

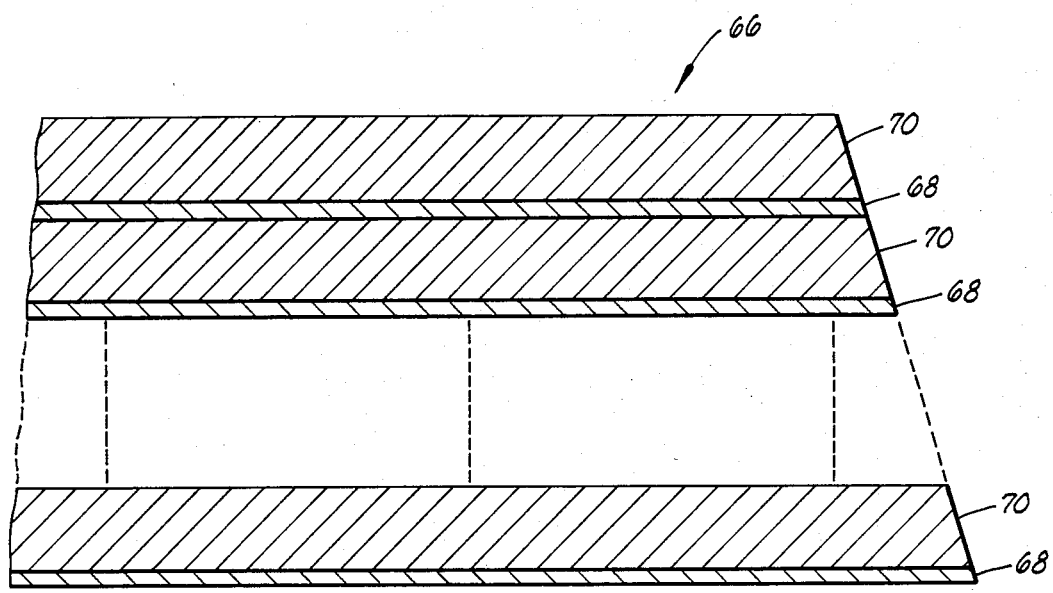
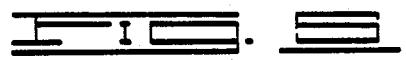
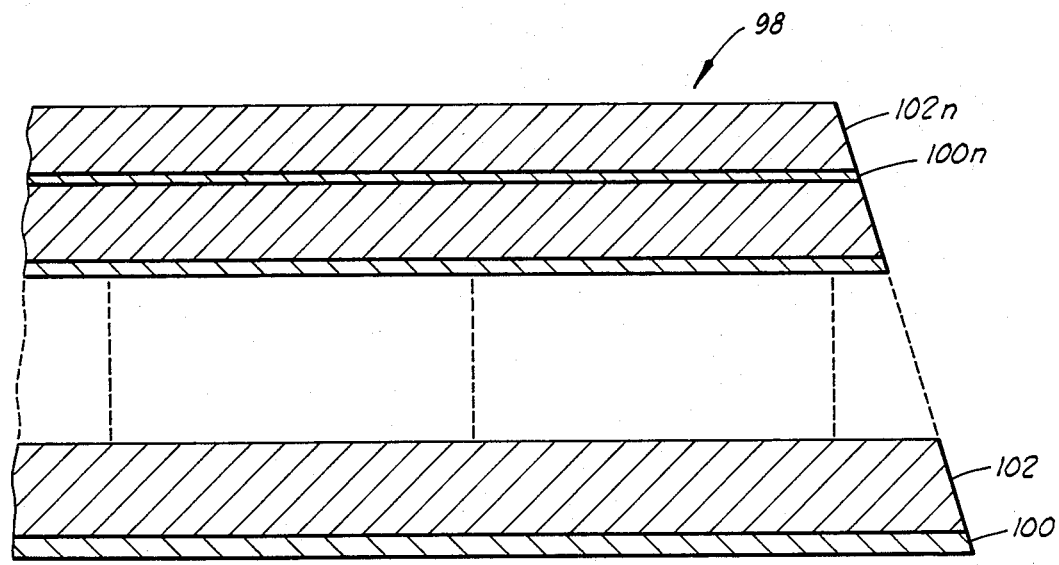
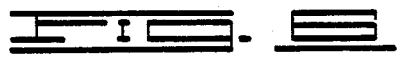

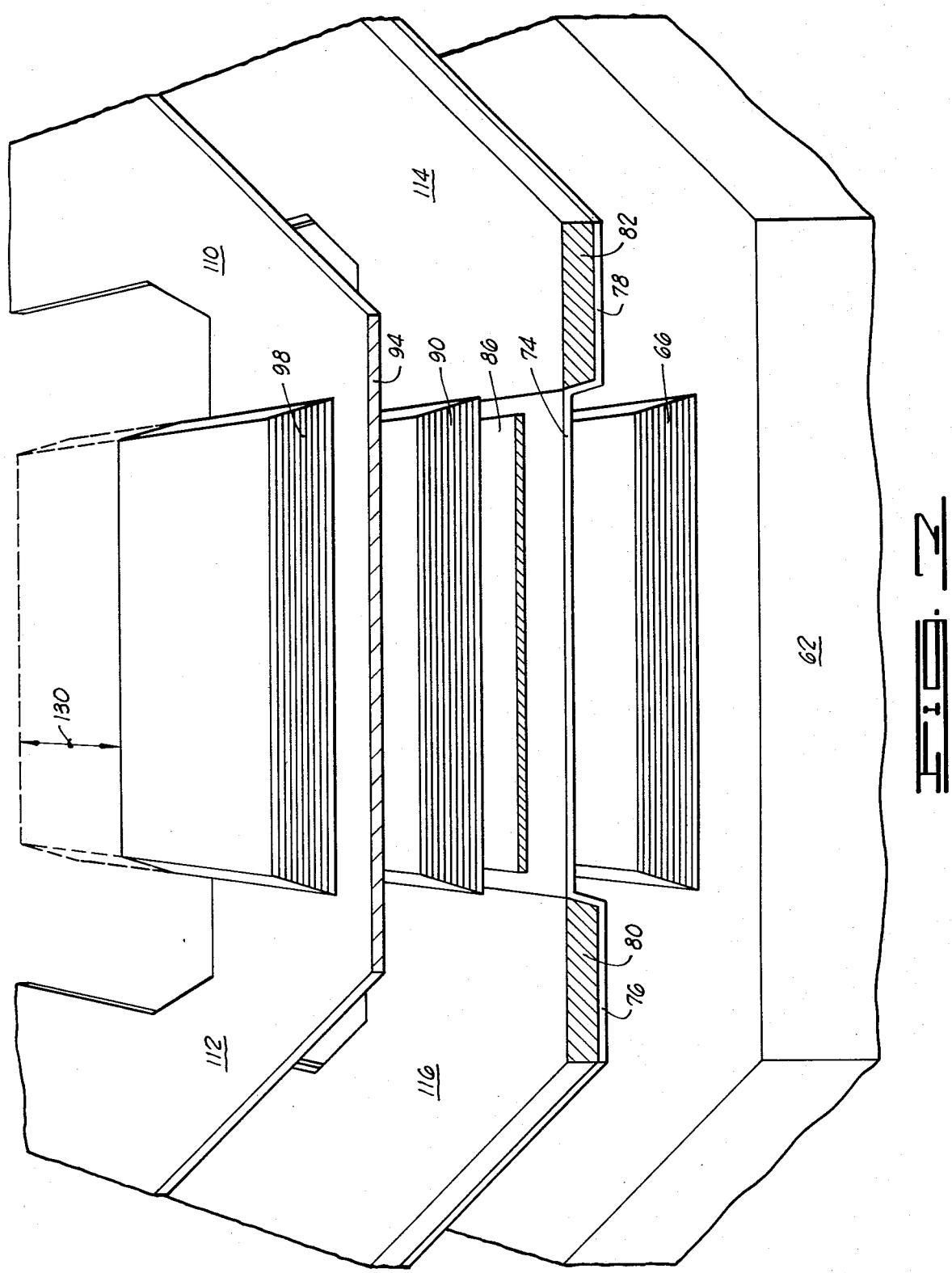

METHOD OF MAKING THIN FILM MAGNETIC RECORDING HEADS

BACKGROUND OF THE INVENTION

1. Field of the Invention

The invention relates generally to magnetic transducer heads and, more particularly, but not by way of limitation, it relates to an improved method of manufacture and article of the thin film magnetic type of read/write transducer head as used in high speed applications for data sensing relative to record media such as tapes, drums, disks and the like.

2. Description of the Prior Art

The prior art includes numerous types of inductive and magnetoresistive recorder heads of the type which utilize thin film technology in formation. Such prior transducer heads utilize various thin film configurations, often times dictated by the particular intended use, and generally speaking the prior transducer head assemblies have utilized unitary thin film elements such as shields, poles and other effective surfaces within the head assembly. A U.S. Pat. No. 3,867,368 in the name of Lazzari does disclose a single multi-layer thin film element in an inductive type transducer head.

The prior art also discloses numerous modes for deposition fabrication of thin film magnetic transducer heads, such processes including the well-known steps of deposition, etching, plating, etc. However, in prior fabrication of the thin film magnetic heads, it was necessary to first fabricate the transducer head and thereafter to bond the transducer head onto a selected slider of the type used in high speed recorder applications. The various processes attendant formation of a thin film magnetoresistive transducer head are thoroughly discussed in U. S. Pat. No. 3,908,194 in the name of Romankiw and this patent even deals with batch fabrication of such magnetic heads. In this teaching, there is utilized a magnetically shielding substrate composed of a ferrite material, and after fabrication of the transducer head it is still necessary to bond the finally produced head to a slider or other support mechanism that may be used in conjunction therewith.

SUMMARY OF THE INVENTION

The present invention contemplates a method of manufacture for forming a thin film magnetic read/write transducer head in situ on a supporting slider element. The method consists of selecting a substrate of a thickness consonant with the length of transducer slider, and thereafter forming in designated areas on top of the substrate wafer a plurality of thin film magnetic transducer heads utilizing the well-known thin film deposition, etching and plating techniques. Thereafter, the substrate wafer is diced and each individual section is finished and polished to yield a complete slider with thin film magnetoresistive or inductive head and electrical contacts borne thereon in operative disposition. One type of thin film magnetoresistive transducer head that is contemplated is of the type that utilizes thin film layers which form a read shield, sensor, bias layer, shield pole and trailing edge pole, and each of the read shield, shield pole and trailing edge pole are made up of a plurality of alternating pairs of thin film layers of selected magnetic material. The bias layer is further deposited as a thin film of permanent magnet material immediately adjacent the read sensor thin film layer of magnetoresistive material.

Therefore, it is an object of the present invention to provide a magnetic recording head that provides high reading efficiencies and small dimensions, thus achieving high recording densities.

It is also an object to provide a thin film magnetoresistive transducer head that includes a shaped write field in order to avoid high reverse field in the trailing edge of the write pole.

It is still further an object to provide such a thin film transducer head of the magnetoresistive type that includes an oriented magnetoresistive stripe enabling uniform and repeatable device performance.

It is also an object of the present invention to provide a high resolution reading device through provision of high permeability shield elements on each side of the magnetoresistive stripe.

It is yet another object of the present invention to provide a thin film magnetoresistive transducer having multi-layer element poles and shields with the trailing edge pole modified in order to yield a significantly improved write characteristic.

Finally, it is an object of the present invention to provide a method of manufacturing a slider and magnetic transducer head, either magnetoresistive or inductive, in combination by depositing the thin film structure on a thick substrate whose thickness is approximately equal to that of the desired length of the recording head slider so that a completely finished integrated recording head can be produced with fewer process steps.

Other objects and advantages of the invention will be evident from the following detailed description when read in conjunction with the accompanying drawings which illustrate the invention.

BRIEF DESCRIPTION OF THE DRAWINGS

FIG. 4 is a perspective view, greatly enlarged, of a finished thin film recorder head in disposition on its associated slider;

FIG. 5 is a partial sectional view, greatly enlarged, of a multi-layer thin film pole or shield of the type utilized in the transducer structure of FIG. 4;

FIG. 6 is a partial sectional view, greatly enlarged, of a multi-layer thin film trailing edge pole as utilized in the structure of FIG. 4; and FIG. 7 is a perspective view in exploded form illustrating further the operative elements of the recorder head of FIG. 4.

DETAILED DESCRIPTION OF THE INVENTION

Figure 1:
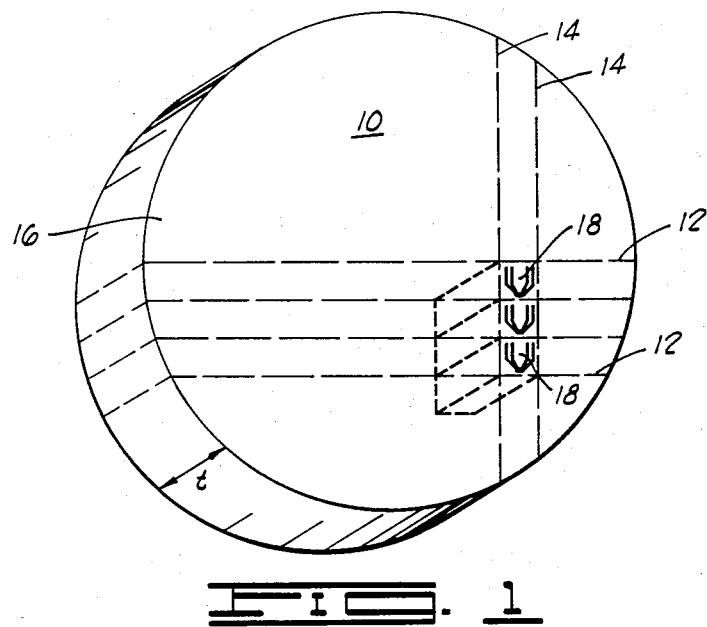
FIG. 1 is a perspective view of a substrate wafer with coordinate areas generally designated on a portion of the surface, and including the deposited thin film magnetic transducer heads thereon.

Referring now to FIG. 1, a wafer of suitable substrate 10 is shown with a plurality of coordinate areas delineated by dicing lines 12 and transverse dicing lines 14. In actual practice, the wafer of substrate 10 may be any of several substances, e.g., a silicon wafer of designated thickness t which is commercially available in standard diameters ranging from 2¼" to about 4". Thus, the coordinate areas laid out over the entire surface face 16 of substrate wafer 10 would be very great in number since a magnetic transducer package 18 deposited within a coordinate area would have dimensions of a few mils square. Thus, a very great number of magnetic transducer head packages 18, either inductive or magnetoresistive, may be simultaneously deposited on wafer surface 16 by means of conventional deposition, masking, etching and plating techniques, as will be further described below.

Figure 2:
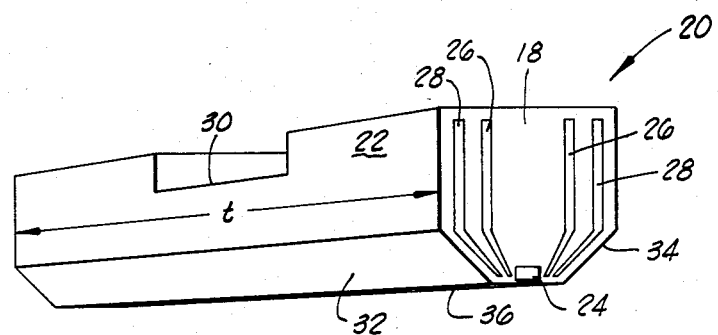
FIG. 2 is a perspective view of a finished slider and thin film transducer head as constructed in accordance with the method of the invention.

After formation of the large plurality of magnetic transducer head packages 18 within each coordinate area, the substrate wafer 10 may be cut along each of dicing lines 12 and dicing lines 14 across the whole expanse of the wafer thereby to produce a large plurality of individual substrate/package combinations which are then finished and polished into a transducer-slider combination 20 as shown in FIG. 2. Thus, the substrate wafer 10 portion having thickness t becomes the slider 22 portion of the transducer head bearing on one end thereof the formation of the magnetic transducing head package 18 which includes a magnetic head 24 with plated or deposited conductors, i.e., write conductors 26 and read conductors 28, as will be further described. Finishing of the diced wafer section and completion of the slider assembly shaping includes the provision of a transverse slot 30 cut in the top portion of slider 22, beveling of opposed lower corners to form bevel surfaces 32 and 34, and final polishing of the flying surfaces 36 across the underside. Thus, there is formed a complete slider-transducer head assembly 20 in relatively fewer process steps that is ready for operational usage.

Figure 3:
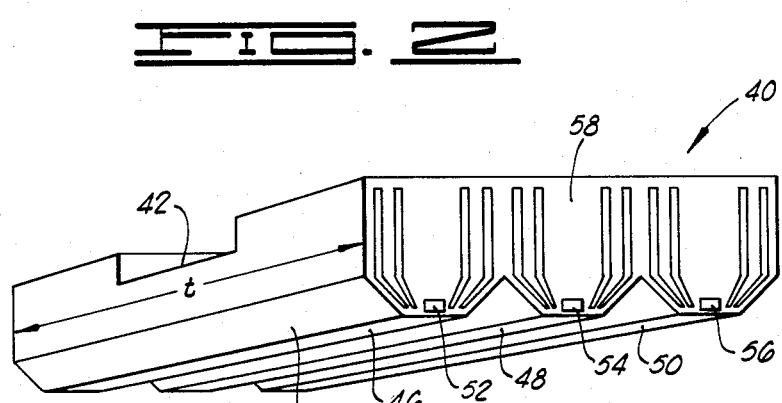
FIG. 3 is an alternative construction of slider and plural transducer head assembly as may be constructed in accordance with the present method of manufacture.

FIG. 3 illustrates a finished triple head slider 40 that is manufactured in a similar type of process, it only being necessary to change the coordinate layout of substrate wafer surface 16 for coaction with the particular scheme of deposition patterns, etching masks, and other incidental patterning which may be attendant. The triple head slider 40 is formed with length t equal to the depth of substrate wafer 10 and is then finally finished and polished to include a transverse slot 42 and a plurality of bevel edges 44 that define underside flying surfaces 46, 48 and 50 coplanar with the sensing stripes of thin film transducer head packages 52, 54 and 56, respectively. The plating or deposition process also provides the requisite read and write conductor leads for each of heads 52, 54 and 56 as exposed for contact on the wafer surface portion or end 58 of slider 40. Such multi-track slider recording head assemblies may be formed for any multiple of thin film recording heads, and these may be batch formed by utilizing the requisite deposition and masking procedures.

FIG. 4 illustrates in greatly enlarged form magnetoresistive read/write transducer head 60 as it is particularly constructed in accordance with the present invention. The depiction of FIG. 4 shows the substrate 62 (the slider portion) in finished form as it would be shaped and polished for final operational usage. At the present time, the substrate 62 is selected to be of silicon since it has desirable high heat conductivity and surface smoothness that aids in receiving thin film depositions thereon. The silicon material also lends itself to milling and machining for formation of the final slider assembly.

During formation of magnetoresistive head 60, the substrate 62 is first overlaid with a first deposition surface 64 of insulator material that is non-magnetic in character and of hard dielectric quality. Such insulated material may be such as $AL_2O_3$ or other oxides of silicon, all materials having requisite properties that are easily deposited and conducive to various etching techniques. Or, in the case of silicon substrate, the initial surface can be heat treated to form a layer of silicon dioxide, a well known art in the semi-conductor industry. Next is deposited a read shield 66, a multi-layer magnetic structure that is made up of an even number of pairs of Nickel-Iron thin film with a thin $SiO_2$ or Titanium film layer in alternation. Thus, the even numbered pairs of thin films form magnetostatically coupled pairs, and serve to lower the total magnetic energy required as well as to remain in stable domain position along a preferred direction.

FIG. 5 illustrates a portion of thin film shield 66 in enlarged form. Thus, a first deposition may be such as silicon dioxide ($SiO_2$) to a thickness of from 20 to 200 Angstroms, and the pair is completed by an overlaid thin film of Nickel-Iron (NiFe) to a thickness of from 500 to 2,000 Angstroms. The thickness of the $SiO_2$ thin film 68 and NiFe thin films 70 may be varied within considerable limits thereby to alter the magnetic properties and response characteristics in desired manner. Accordingly, shield 66 is then finally formed by the stacking of a plurality of such pairs of thin films 68 and 70 as successively applied by deposition. In device fabrication, the multi-layer thin films 68–70 may be deposited successively by any of several well-known techniques, including vacuum evaporation of sputtering techniques, and the operation can be performed in a single vacuum pump down. The pattern limits of thin film may then be etched either by chemical etching, sputter etching, or by the ion-milling method.

A relatively thin film of insulator 72 (see FIG. 4) is then deposited over the shield 66, and the insulator once again may be $Al_2O_3$ or the well-known glass compositions including $SiO_2$ and related silicates and silicon nitrate. A magnetoresistive (MR) sensor 74 is then deposited to overlay the shield 66 in insulatively spaced disposition. Sensor 74 consists of a deposition of magnetoresistive material, such as NiFe alloy, and suitable conductive contact layer is formed in extension, as at 76 and 78, to receive electrically conductive contact with plated conductors 80 and 82. Referring also to FIG. 7, conductor films 80 and 82 may be formed by conventional conductor deposition of such as gold, aluminum or the like as applied using flashing and plating processes through the requisite masking. The thin film MR sensor 74 may be deposited or sputtered to a thickness ranging from 200 through 500 Angstroms, depending upon the desired characteristics to be imparted to the magnetic read head.

The next thin film of insulator material, e.g., the similar glass or glass-like materials as previously specified, is deposited across conductors 80 and 82 and the MR sensor 74. This surface then receives deposition of a bias thin film 86 which consists of a thin film deposit of suitable permanent magnet material such as Alnico or other high remanence alloy. The permanent magnet bias thin film 86 provides control of thin film domain orientation within the read elements. Another deposition of insulator 88 then overlays bias thin film 86 to receive deposition in properly spaced manner of a shield pole 90 which may be identical to the pole 66 as shown in enlarged form in FIG. 5. Thus, shield pole 90 consists of successive layers of magnetostatically coupled pairs of $SiO_2$ or Ti and NiFe thin films to a requisite stacking height, for example, on the order of 20,000 Angstroms. The shield pole 90 is also then overlaid with an insulator film 92 of the same type previously used, to receive deposition of a write conductor 94 as disposed for inductive coupling to its associate write poles. The write conductor 94 may be formed in requisite pattern by sputtering with subsequent plating of conductive material to desired thickness.

A final insulative thin film 96 is then applied to receive thereon a trailing edge pole 98 of the multi-layer thin film type. Thus, trailing edge pole 98 also consists of a stack of magnetostatically coupled pairs of SiO₂ (or Ti) and NiFe thin films; however, the thickness and arrangement is altered in order to shape the write field of the unit. Thus, as shown in FIG. 6, the similar pairs of SiO₂ thin film 100 and NiFe thin film 102 are utilized to form the stacked pairs of magnetostatically coupled thin films; however, the write pole element is desirably shaped by progressively reducing the thickness of successive thin films 100 and 102 proceeding toward the trailing edge of the record head 60. This is illustrated in FIG. 6 as it can be seen that the upper two thin films 100n and 102n are each of proportional diminution relative to the base thin films 100 and 102.

Referring again to FIG. 4, each of shield 66, shield pole 90 and trailing edge pole 98 are of generally square planar expanse within the record head 60. Thus, the transverse dimension illustrated by arrow 104 may be of the order of 0.7 to 1.0 mil as defined by the recording track density requirements, and the dimension perpendicular thereto, or the depth of the respective shields and poles, may be patterned to be approximately the same or larger extending the film stack in direction 130. The final stacked thin film structure is then encapsulated by suitable passivation material such as glass or other hermetically sealing material as applied in a coating 106 and, if desired, a thin coating of such passivation material 106 may be extended over the entire magnetic head face to be finally finished in conjunction with the flying surface of substrate 62.

The read and write conductors are shown generally as being sputtered and plated on the sides of recording head 60. In FIG. 4, the write conductors 110 and 112 and read conductors 114 and 116 may be formed by any of several acceptable integrated circuit techniques to provide the proper conductor continuity, shown generally for write conductor 94 by dash lines 118 and 120, and for read conductor 80 and 82 by means of dash lines 122 and 124. Such connections may be made for example by provision of deposition and plating with proper masking and etching during the actual thin film deposition process with subsequent bonding or plating of external lead connectors, as is well known in the art. Such techniques are fully described in the aforementioned U.S. Pat. No. 3,908,194 to name but a single source.

FIG. 6 better illustrates the manner of formation of the read and write conductors as they are mask deposited and plated during the thin film formation process. Thus, after deposition of the MR film 74, with provision of extensions 76 and 78, the metal conductors 80 and 82 are formed, adjacent thereto and in electrical contact, to extend outward and rearward in hairpin configuration (116 and 114) where subsequent contact procedures will enable external terminal connections. In like manner, after formation of insulative film 92 (FIG. 4) in overlay on shield pole 90, the inductive write conductor 94 is similarly deposited and plated to extend lateral rearward conductor portions 112 and 110 for formation of external write terminals. The numerous insulative films are omitted from FIG. 6 for clarity, but they would of course be present in final formation and the passivation coating 106 is then applied over the entire thin film formation with exposure of only the terminal contacts for read conductor plates 116 and 114, and write conductor plates 112 and 110.

When in operation, the slider transducer head assembly is positioned for sensing with the recording medium moving in the direction of the arrow 132 in FIG. 4, i.e., perpendicular to the shield 66, shield pole 90 and trailing edge pole 98. In the read mode, the sensor 74 provides magnetoresistive pickup as energy change information is conveyed by direct connection to the read conductors 80 and 82. Domain orientation of the magnetoresistive sensor 74 is assured by the permanent magnet bias thin film 86 overlaid thereon in insulative disposition. The polar elements in read mode are the shield 66 and shield pole 90 which functions as a shield during read operation, thus defining the magnetoresistive stripe at the read sensing interface. In write mode, shield pole 90 then functions as a leading edge pole in conjunction with the trailing edge pole 98, and inductive coupling to the write conductor 94 provides output of write indication via write conductors 110 and 112.

The foregoing discloses both a method of manufacture and an improved light-loading magnetic recording head of the thin film magnetoresistive type. The present invention utilizes an entirely different form of transducer element formation by multi-layer thin film deposition, and such manipulation of the degree and type of homogeneity of transducer element greatly enhances the versatility and applications for thin film magnetic transducers of either the inductive or magnetoresistive type. While the foregoing description makes reference to certain dimensions and materials, it should be understood that there are numerous materials suitable for construction of thin film magnetic heads as described, and the particular thin film dimensions may also be subject to wide variation depending upon operational attributes of a particular magnetic transducer.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method of manufacture for unitarily forming a magnetic transducer head and slider comprising the steps of:
   (a) disposing a uniformly thick substrate within a selected deposition environments, said thickness being equal to the desired length of the transducer slider;
   (b) depositing by serial acts of deposition and etching a magnetic read/write formation with associated conductors at a predesignated coordinate area on the surface of said substrate, said step of depositing including the steps of:
      (i) forming a shield adjacent said substrate, said shield being formed of alternating magnetic thin film pairs;
      (ii) forming a magnetoresistive stripe by depositing a magnetic thin film sensor in insulated disposition over said shield;
      (iii) depositing read conductors in contact with said thin film sensor;

(iv) forming a thin film permanent magnet bias layer over said thin film sensor in insulated disposition therefrom;

(v) depositing a thin film shield pole in insulated disposition over said bias layer;

(vi) depositing a write conductor in insulated disposition over said shield pole; and (vii) depositing a trailing edge thin film pole in insulated disposition over said write conductor, each of said shield pole and trailing edge pole being formed by serial deposition of alternating thin film pairs of magnetic and insulative material;

(c) cutting said coordinate area from said substrate; and (d) finishing and polishing said cut substrate to form a transducer slider of requisite size and shape with said magnetic read/write formation disposed to place the sensing area in operative position for sense interaction with a recording medium.

2. A method of manufacture as set forth in claim 1 wherein said trailing edge pole is deposited to include a greater number of said alternating thin film pairs than does said shield pole.

3. A method of manufacture as set forth in claim 1 wherein said thin films of magnetic material are deposited at greater thickness than said thin films of insulative material in said shield pole and trailing edge pole.

4. A method of manufacture as set forth in claim 3 wherein: said alternating thin film pairs are deposited to form said trailing edge pole so that they will have progressively less thickness proceeding upward from said write conductor.

5. A method of manufacture for unitarily forming a magnetic transducer head and slider comprising the steps of:

(a) disposing a uniformly thick substrate within a selected deposition environment, said thickness being equal to the desired length of the transducer slider;

(b) depositing by serial acts of deposition and etching a magnetic read/write formation with associated conductors at a predesignated coordinate area on the surface of said substrate, said step of depositing including the step of:

(i) forming a shield adjacent said substrate, said shield being formed of alternating magnetic thin film pairs;

(ii) forming a magnetoresistive stripe by depositing a magnetic thin film sensor in insulated disposition over said shield;

(iii) depositing read conductors in contact with said thin film sensor;

(iv) forming a thin film permanent magnet bias layer over said thin film sensor in insulated disposition therefrom;

(v) depositing a thin film shield pole in insulated disposition over said bias layer;

(vi) depositing a write conductor in insulated disposition over said shield pole; and (vii) depositing a trailing edge thin film pole in insulated disposition over said write conductor, each of said shield, shield pole and trailing edge pole being deposited as alternating thin film layers of Nickel-Iron alloy and silicon dioxide; and said thin film permanent magnet layer being a deposition of high remanence magnetic material;

(c) cutting said coordinate area from said substrate; and (d) finishing and polishing said cut substrate to form a transducer slider of requisite size and shape with said magnetic read/write formation disposed to place the sensing area in operative position for sense interaction with a recording medium.

6. A method of manufacture for unitarily forming a magnetic transducer head and slider comprising the steps of:

(a) disposing a uniformly thick substrate within a selected deposition environment, said thickness being equal to the desired length of the transducer slider;

(b) depositing by serial acts of deposition and etching a magnetic read/write formation with associated conductors at a predesignated coordinate area on the surface of said substrate, said step of depositing including the steps of:

(i) forming a shield adjacent said substrate, said shield being formed of alternating magnetic thin film pairs;

(ii) forming a magnetoresistive stripe by depositing a magnetic thin film sensor in insulated disposition over said shield;

(iii) depositing read conductors in contact with said thin film sensor;

(iv) forming a thin film permanent magnet bias layer over said thin film sensor in insulated disposition therefrom;

(v) depositing a thin film shield pole in insulated disposition over said bias layer;

(vi) depositing a write conductor in insulated disposition over said shield pole; and (vii) depositing a trailing edge thin film pole in insulated disposition over said write conductor, each of said shield, shield pole and trailing edge pole being deposited as alternating thin film layers of Nickel-Iron alloy and Titanium; and said thin film permanent magnet layer being a deposition of high remanence permalloy material;

(c) cutting said coordinate area from said substrate; and (d) finishing and polishing said cut substrate to form a transducer slider of requisite size and shape with said magnetic read/write formation disposed to place the sensing area in operative position for sense interaction with a recording medium.

7. A method of manufacture for unitarily forming a magnetic transducer head and slider comprising the steps of:

(a) disposing a uniformly thick substrate within a selected deposition environment, said thickness being equal to the desired length of the transducer slider;

(b) depositing by serial acts of deposition and etching a magnetic read/write formation with associated conductors at a predesignated coordinate area on the surface of said substrate, said step of depositing including the steps of:

(i) depositing adjacent said substrate a shield consisting of multi-layer thin films;

(ii) depositing thereover in insulative disposition a thin film magnetic sensor;

(iii) depositing thereover in insulative disposition a shield pole consisting of multi-layer thin films;
(iv) depositing thereover in insulative disposition a conductor material; and
(v) depositing thereover in insulative disposition a trailing edge pole consisting of multi-layer thin films;
    each of said shield, shield pole and trailing edge pole multi-layer thin films consisting of alternating thin films of Nickel-Iron alloy and Silicon Dioxide, (c) cutting said coordinate area from said substrate; and
(d) finishing and polishing said cut substrate to form a transducer slider of requisite size and shape with said magnetic read/write formation disposed to place the sensing area in operative position for sense interaction with a recording medium.

8. A method as set forth in claim 7 wherein:
said trailing edge pole thin films are varied in thickness to be proportionately smaller progressing toward the uppermost thin film layer.

* * * * *